Jan. 10, 1950 E. J. FRIEDRICH 2,493,758
TORQUE MEASURING DEVICE
Filed Oct. 22, 1945

INVENTOR.
EITEL J. FRIEDRICH
BY
ATTORNEYS

Patented Jan. 10, 1950

2,493,758

UNITED STATES PATENT OFFICE 2,493,758

TORQUE MEASURING DEVICE

Eitel J. Friedrich, London, Ohio

Application October 22, 1945, Serial No. 623,841

3 Claims. (Cl. 73—134)

(Granted under the act of March 3, 1883, as amended April 30, 1928; 370 O. G. 757)

The invention described herein may be manufactured and used by or for the Government for governmental purposes without payment to me of any royalty thereon.

This invention relates to a torque measuring device and more particularly to the type which is suitable for measuring the amount of torque produced by either a high or low horsepower motor or a high or low speed motor through a relatively simple adjustment of the parts employed in the construction of the device.

Torque produced by a motor can be measured by causing the motor to rotate a metallic disc through a magnetic field created by an electromagnet. The magnetic field thus created imparts a brake drag or torque on the rotating disc and through suitable means the torque or drag thus produced is measured on a scale provided for that purpose. In a device of this type, however, rotation of the disc through the magnetic field will be retarded to some extent by reason of the frictional resistance created by disc rotating through the atmosphere. This is especially true where a high speed low horsepower motor is caused to rotate a large metallic disc at relatively high speed through a magnetic field in order to measure the amount of torque produced by the motor. It is obvious, therefore, that the amount of frictional resistance thus created will cause the torque measuring device to render an inaccurate measurement reading since the torque measuring device is intended to measure only the amount of drag or braking action produced by the magnetic field. Since frictional resistance will be produced by the rotation of a disc of any size through a magnetic field, it is the object of the invention to provide a means whereby discs of different sizes can be used in order to minimize the amount of frictional resistance, thereby enabling the torque measuring device to render a more accurate reading of the amount of torque produced in the motor being tested.

Another object of the invention is to provide a device of this character which will permit direct reading of the torque produced by the motor being tested.

Another object of the invention is to provide a device of this type with means whereby the motor which is being tested can be adjusted relative to the magnet used for producing the magnetic field.

Another object of the invention is to so construct a torque measuring device as will permit the use of a small disc in order to minimize frictional resistance when the torque of a high speed low horsepower motor is being measured.

Another object of the invention is to provide a device of this character which is simple in construction and accurate in operation and which will provide for a more accurate measurement of the amount of torque developed by a motor when the device is in use.

With the above and other objects in view, the invention consists in the construction, combination and arrangement of parts as will be described more fully hereafter.

Novel features which are characteristic of this invention are set forth with particularity in the appended claims. The invention will be better understood from reference to the following description when considered in connection with the accompanying drawing in which:

Like characters of reference denote similar parts throughout the several views of the drawing and in the specification.

Figure 1:
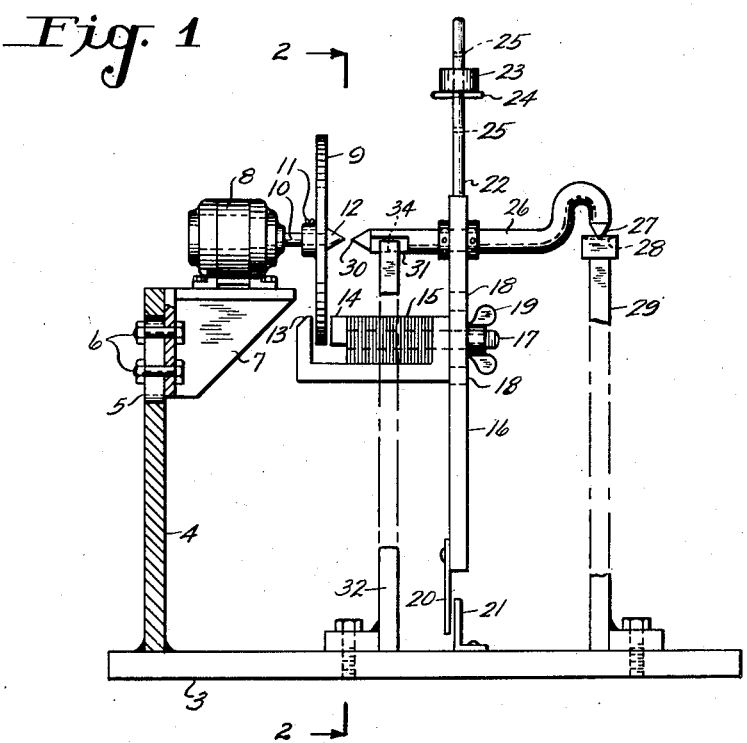
Fig. 1 is a side elevation with parts shown in section of a torque measuring device constructed in accordance with my invention.
Figure 2:
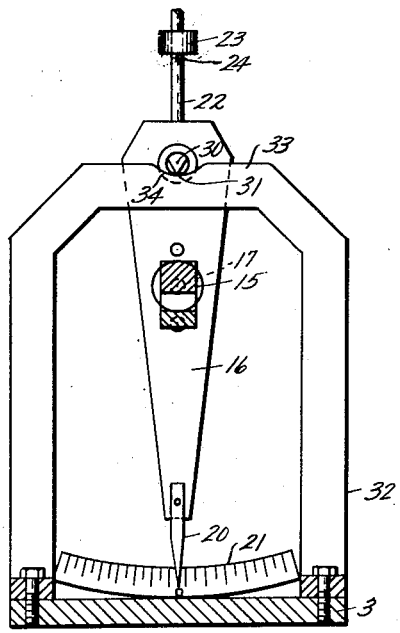
Fig. 2 is a view taken on line 2—2 of Fig. 1, looking in the direction of the arrows.

Referring to the drawing, the torque measuring device constructed in accordance with my invention comprises a base member 3 from which the standard 4 extends upwardly a suitable distance and is provided in its upper portion with a slot or opening 5 through which extends bolts 6 for securing a shelf 7 thereto. The shelf 7 supports a motor 8 to be torque tested and is adjustably mounted on the standard 4 by reason of the bolt and slot arrangement provided for that purpose, as clearly illustrated in Fig. 1 of the drawing. A metallic disc 9 is detachably secured to the shaft 10 of the motor by means of a set screw 11 and is provided with a centering point 12 for a purpose described more fully hereinafter. The disc 9 is rotated between the opposed faces 13 and 14 of an electromagnet 15 which is mounted on arm 16 by means of a bolt 17 which extends through one of the openings 18. A wing nut 19 is threaded on bolt 17 for securing the electromagnet to the arm 16. A plurality of openings 18 are provided in arm 16 for mounting the electromagnet in selected position on the arm 16. An indicating pointer 20 is secured to the lower end of the indicating arm 16 and extends over a graduated scale 21 on the base 3. An extension shaft 22 extends from the upper or top portion of the arm 16 mid-centrally thereof, as shown in Fig. 2, and a weight member 23 is placed on the extension shaft and is adjustably held thereon by means of removable pin 24 which extends through one of the openings 25 formed in the extension shaft. The weight 23 is adjustable on shaft 22 to vary the sensitivity of the indicating arm when the device is in use.

The arm 16 is rigidly secured to a horizontal rod 26 which lies in a plane parallel to base 3. One end of the rod is provided with a point 27 of hard steel which rests in a cone-shaped cavity or depression 28 of hard steel formed in the upper portion of posts 29. The other end of the rod 26 terminates in a centering point 30 and knife-edge 31. Upright 32 consisting of a pair of vertical struts extends upwardly from the base 3 and is connected at its upper end by a connecting strut 33 in which is formed a depression 34 at the central portion thereof as shown in Fig. 2 of the drawing. The point 27, the bottom of the cavity 28, the knife edge 31, and the bottom of the depression 34, all are positioned in the axis of the shaft 26. The depression 34 is formed of hard steel and is adapted to form a support bearing for the knife-edge 31 of the rod 26. The knife-edge 31 resting in depression 34 and point 27 resting in cavity 28 will offer little resistance to the movement of the indicating arm 16 secured to the rod 26 when the device is in use and the indicating arm is caused to swing or travel in the direction of the rotation of the disc 9 rotated by the motor being tested.

The centering points 12 and 30 are provided to facilitate axial alignment of the shaft 26 and the shaft of the motor being tested. This axial alignment insures equality between the torque arm of the torque produced by the disc and the torque arm of the opposing torque produced by the electromagnet. When the indicating arm 16 is at the rest position the force tending to rotate the indicating arm must be equal to the braking force on the disc. Hence, since torque=force× torque arm the two opposing torques are also equal. Therefore, the torque tending to rotate or swing the indicating arm is equal to the torque produced by the motor and the movement of the indicating arm is proportional to the torque produced thereby.

The rotation of the disc between the opposed faces of the electromagnet will cause the disc to cut through the line of force created by the electromagnet thereby causing the indicating arm to swing in the direction of rotation of said disc.

It will be noted that the electromagnet can be mounted in different positions on the indicating arm 16. This will permit the rotation of different size discs through the opposed faces of the electromagnet. Also, by reason of the adjustable shelf 7, motors of different physical size can be mounted on the shelf and the shaft thereof aligned with the centering point of rod 26 by reason of the bolt and slot arrangement previously described.

I claim:

1. A torque measuring device comprising a frame, a pendulous indicator, means pivotally supporting said indicator on said frame for swinging movement in either direction from a zero position, adjustable counterweight means on said pendulous indicator to modify the effective force required to move said pendulous indicator away from the zero position, a disc secured to and adapted to be rotated by the motor which is to be torque tested, adjustable means for aligning the axis of said disc with the axis of said pivotal means, an electromagnet carried by and swingable with said pendulous indicator, opposite poles of said electromagnet being positioned on opposite sides of said disc near its periphery, means for selectively positioning said electromagnet along said pendulous indicator radially of said axis to accommodate different sizes of discs, a pointer at the lower end of said pendulous indicator, and a zero center segmental scale associated with said pointer graduated in foot pounds torque in both directions from the center, whereby motors may be tested for torque in either direction of rotation.

2. In a torque measuring device of the character described, a pendulous indicator, means pivotally supporting said indicator to permit swinging movement of said indicator in either direction from a zero position, a disc adapted to be rotated by the motor which is to be torque tested, adjustable means for aligning the axis of said disc with the axis of said pivotal means, an electromagnet carried by and swingable with said pendulous indicator, opposite poles of said electromagnet being positioned alongside said disc whereby the magnetic circuit is completed through said disc, a pointer at the lower end of said pendulous indicator, and a zero center segmental scale associated with said pointer graduated in foot pounds torque in both directions from the center, whereby motors may be tested for torque in either direction of rotation.

3. In a torque measuring device of the character described, a pendulous indicator, pivotal means for said indicator to permit swing of said indicator in either direction from a zero position, a disc adapted to be rotated by the motor which is to be torque tested, means for aligning the axis of said disc with the axis of said pivotal means, an electromagnet carried by and swingable with said pendulous indicator, the magnetic circuit of said electromagnet being completed through said disc, a pointer at the lower end of said pendulous indicator, and a zero center segmental scale associated with said pointer graduated in foot pounds torque in both direction from the center.

EITEL J. FRIEDRICH.

REFERENCES CITED

The following references are of record in the file of this patent:

UNITED STATES PATENTS

| Number | Name | Date |
| --- | --- | --- |
| 302,976 | Bracket | Aug. 5, 1884 |
| 1,382,694 | Towar | June 28, 1921 |
| 1,557,956 | Zubaty | Oct. 20, 1925 |
| 2,217,088 | Wilson et al. | Oct. 8, 1940 |

FOREIGN PATENTS

| Number | Country | Date |
| --- | --- | --- |
| 2,702 | Great Britain | A. D. 1900 |
| 314,574 | Great Britain | July 1, 1929 |
| 365,466 | Germany | Dec. 15, 1922 |